United States Patent
Park et al.

(10) Patent No.: US 7,804,268 B2
(45) Date of Patent: Sep. 28, 2010

(54) APPARATUS AND METHOD OF CONTROLLING INJECTION IN ELECTRIC INJECTION MOLDING MACHINE

(75) Inventors: Kyong-ho Park, Gyeonggi-do (KR); Jong-min Lee, Seoul (KR)

(73) Assignee: LS Mtron Ltd., Gyeonggi-do (KR)

( * ) Notice: Subject to any disclaimer, the term of this patent is extended or adjusted under 35 U.S.C. 154(b) by 364 days.

(21) Appl. No.: 11/979,729

(22) Filed: Nov. 7, 2007

(65) Prior Publication Data
US 2008/0129240 A1    Jun. 5, 2008

(30) Foreign Application Priority Data
Nov. 8, 2006   (KR) ............... 10-2006-0110003

(51) Int. Cl.
*G05B 19/29* (2006.01)
(52) U.S. Cl. ............. 318/602; 318/600; 318/601; 318/652
(58) Field of Classification Search .......... 318/600, 318/601, 652

See application file for complete search history.

(56) References Cited

U.S. PATENT DOCUMENTS

| | | | | | |
|---|---|---|---|---|---|
| 5,153,149 | A | * | 10/1992 | Naito et al. | 425/136 |
| 6,332,355 | B1 | * | 12/2001 | Totani et al. | 73/162 |
| 6,846,438 | B2 | * | 1/2005 | Suzuki et al. | 264/40.1 |
| 6,870,344 | B2 | * | 3/2005 | Jinbo | 318/609 |
| 7,144,238 | B2 | * | 12/2006 | Chao | 425/145 |

* cited by examiner

*Primary Examiner*—Bentsu Ro
*Assistant Examiner*—David S Luo
(74) *Attorney, Agent, or Firm*—McDermott Will & Emery LLP

(57) ABSTRACT

An apparatus and method of controlling injection in an electric injection molding machine including a motor and a screw. The apparatus has an encoder detecting a current position of the screw and outputting the detected position as an encoding signal, a memory storing reference positions of the screw according to a drive of the motor by the passage of time, and a current controller checking an elapse of time that the screw moves from a previous position to a current position through receiving the encoding signal from the encoder, reading out a section of time corresponding to the checked elapse of time from the memory, and controlling a current value applied to the motor based on a difference between a reference position of the screw corresponding to the read-out section of time and a current position of the screw.

6 Claims, 4 Drawing Sheets

APPARATUS AND METHOD OF CONTROLLING INJECTION IN ELECTRIC INJECTION MOLDING MACHINE

CROSS-REFERENCE TO RELATED APPLICATION

This application claims all benefits of Korean Patent Application No. 10-2006-0110003 filed on Nov. 8, 2006 in the Korean Intellectual Property Office, the disclosures of which are incorporated herein by reference.

BACKGROUND OF THE INVENTION

1. Field of the Invention

The present invention relates to an apparatus and method of controlling injection in an electric injection molding machine, and more particularly to an apparatus and method of controlling injection in an electric injection molding machine in which the number of control loops is minimized upon operation of the injection molding machine to thereby reduce a loop time and a scanning time in the control process and make a production rate of an injection molding product speedy.

2. Description of the Prior Art

Generally, an electric injection molding machine of the prior art, as shown in FIG. 1, includes a barrel 11, a screw 12, a motor 20, an encoder 21, a main controller 22, a velocity controller 23, a current controller 24, a velocity converter 25, and a power converter 26.

The barrel 11 is a portion to which a resinous solution is injected. The screw 12 is connected with the motor 20 so as to move back and forth in the barrel through rotation.

A structure that the barrel 11 and the screw 12 are combined with each other is called an injection shaft. When the screw 12 in the barrel 11 is moved back and forward by rotating motion of a ball screw 15 according to a drive of the motor 20, a pressure is generated in the barrel 11 so that the resinous solution can be injected.

The encoder 21 is connected with the motor 20, the main controller 22, and the velocity converter 25, and the velocity converter 25 and the main controller 22 are connected with the velocity controller 23. The velocity controller 23 is connected with the current controller 24, which is connected with the power converter 26, which is in turn connected with the motor 20.

The encoder 21 outputs a position of the screw 12 according to a drive of the motor 20 as an encoding signal.

The velocity converter 25 differentiates and converts the encoding signal output from the encoder 21 to velocity data of the screw 12, and transmits the date to the velocity controller 23. For example, the velocity converter 25 is composed of a differentiator.

The main controller 22 transmits, to the velocity controller 23, predetermined velocity data such that the screw 12 moves in a proper velocity. For instance, the predetermined velocity data is input through an input unit (not shown). The input unit is composed of a key input (key pad), for example.

Further, the main controller 22 determines the position of the screw 12 from the encoding signal received from the encoder 21.

The velocity controller 23 compares the velocity data from the velocity converter 25 with the predetermined velocity data from the main controller 22, calculates a rotation velocity of the motor 20 corresponding to the moving velocity of the screw 12, and transmits the calculated data to the current controller 24.

The current controller 24 receives an instruction current value, and conducts a close loop control through measuring the amount of current from the power converter 26 so as to follow the current value. Then, the power converter 26 is driven. The current controller calculates a quantity of power required for the control of rotation velocity of the motor 20 using the data transmitted from the velocity controller 23. Further, the current controller 24 obtains power corresponding to the calculated quantity of power through a current loop, and transmits it to the motor 20 to thereby drive the motor 20.

The power converter 26 switches a power device of a final output terminal with a signal generated from the current controller 24 to thereby apply the instruction current value to the motor.

In such a construction, a method of controlling injection will be described as follows.

First, when the motor 20 is driven, the encoder 21 outputs, as an encoding signal, a position of the screw 12 according to a drive of the motor 20 (step 21). The encoder 21 transmits the outputted encoding signal to the velocity converter 25 and the main controller 22.

Then, the main controller 22 checks the current position of the screw 12 using the encoding signal transmitted from the encoder 21.

Then, the velocity converter 25 differentiates and converts the encoding signal outputted from the encoder 21 to velocity data of the screw 12 (step 22), and transmits the converted current velocity data of the screw 12 to the velocity controller 23.

Then, the velocity controller 23 compares the predetermined velocity data of the main controller with the current velocity data of the screw 12, and calculates an instruction current value of the motor 20 for moving the screw 12 at a proper velocity (step 23). Next, the calculated instruction current value is transmitted to the current controller 24.

Then, the current controller 24 transmits the instruction current value from the velocity controller 23 to the motor 20 via the power converter 26 through the close loop control of current value (step 24).

The motor 20 is driven at a certain rotation velocity according to the amount of the current transmitted from the power converter 26 (step 25).

Next, the encoder 21 outputs the position of the screw 12 according to the drive of the motor 20 as an encoding signal.

That is, the above injection control operation is repeated from the step 21, which is called a velocity loop.

Briefly, in the injection control method in the electric injection molding machine of the prior art, an injection molding velocity, i.e., a moving velocity of the screw in the injection molding machine, is controlled through the main controller 22, the current loop and the velocity loop.

Like this, the injection control in the prior injection molding machine should pass through the velocity controller in front of the current controller, and should also receive an velocity instruction from the main controller 22. That is, two control loops (velocity loop, current loop) should be carried out.

While a control loop has a tendency to increase whole loop time two times as it goes toward outer loop, the main controller 22 generally has a tendency to operate lately relative to a servo driver. Further, the velocity converter 25 comes to need an algorithm for measuring the actual velocity and reducing noises occurring during calculating the velocity from the encoder signal for velocity control. In the prior art, there causes a problem in that a molding time of an injection mold is consumed a lot due to increase in scanning time.

That is, due to the velocity converter 25 and the main controller 22 installed outside, in fact, the control scanning time is increased, and in high velocity and high precision injection, the control is not rapidly reactive to the input from the main controller 22, which are problematic.

Further, in manufacturing a product through the injection control in the prior electric injection molding machine, velocity data of the screw are input differently for each case so that a problem arises in that deviation in quality between products manufactured occurs.

SUMMARY OF THE INVENTION

Accordingly, the present invention has been made to solve the above-mentioned problems occurring in the prior art, and an object of the present invention is to provide an apparatus and method of controlling injection in an electric injection molding machine in which the operations of control loop are minimized upon operation of the injection molding machine to thereby reduce a loop time and a scanning time in the control process and make a production rate of an injection molding product speedy.

Another object of the present invention is to provide an apparatus and method of controlling injection in an electric injection molding machine in which optimized positions of a screw by time are used as a reference input of injection control input so that data with improved repetitive precision can be obtained, and that deviation in quality between products manufactured can be reduced.

In order to accomplish the above and other objects, in accordance with an aspect of the present invention, there is provided an apparatus for controlling injection in an electric injection molding machine including a motor and a screw, the apparatus comprising: an encoder detecting a current position of the screw and outputting the detected position as an encoding signal; a memory storing reference positions of the screw according to a drive of the motor by the passage of time; and a current controller checking an elapse of time that the screw moves from a previous position to a current position through receiving the encoding signal from the encoder, reading out a section of time corresponding to the checked elapse of time from the memory, and controlling the current value applied to the motor based on a difference between a reference position of the screw corresponding to the read-out section of time and a current position of the screw.

Herein, the memory stores, by the passage of time, reference positions of the screw from injection start to injection end.

The apparatus for controlling injection in an electric injection molding machine further includes a subtractor calculating a difference between a reference position of the screw and a current position of the screw; and a switching controller generating an instruction current value based on the difference calculated from the subtractor and the difference variation by time, and transmitting the same to the current controller.

The switching controller generates the instruction current value in such a way that if the reference position of the screw does not reach the current position of the screw, the instruction current value is generated such that the current position is provided to decrease, and if the reference position of the screw exceeds the current position of the screw, the instruction current value is generated such that the current position is provided to increase.

Herein, the current controller receives the instruction current value from the switching controller, carries out a close loop control through measuring the amount of current from the power converter so as to follow the current value, and drives the power converter.

The apparatus further comprises a switching section transmitting the encoding signal outputted from the encoder to the current controller and the memory according to a switching operation.

The switching section includes: a first switching unit transmitting the encoding signal outputted from the encoder to the memory according to the switching operation; a second switching unit transmitting the encoding signal outputted from the encoder to the subtractor according to the switching operation; and a third switching unit transmitting the instruction current value of the switching controller to the current controller according to the switching operation.

In another aspect of the present invention, there is provided a method of controlling injection in an electric injection molding machine including a motor and a screw, the method comprising the steps of: (a) storing data of reference positions of the screw according to a drive of the motor by the passage of time; (b) checking an elapse of time that the screw moves from a previous position to a current position to read out a section of time corresponding to the checked elapse of time from the data stored, and (c) calculating an instruction current value based on a difference between a reference position of the screw corresponding to the read-out section of time and a current position of the screw to thereby control the drive of the motor.

Herein, the step (a) stores, by the passage of time, reference positions of the screw from injection start to injection end.

In the present invention, the motor can be driven by velocity and position commands, wherein in case of driving with velocity command, the motor is driven with the same method as the prior art. However, in case of driving with the position command through the switching controller, the motor is driven based on position data stored in the memory.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings.

Figure 1:
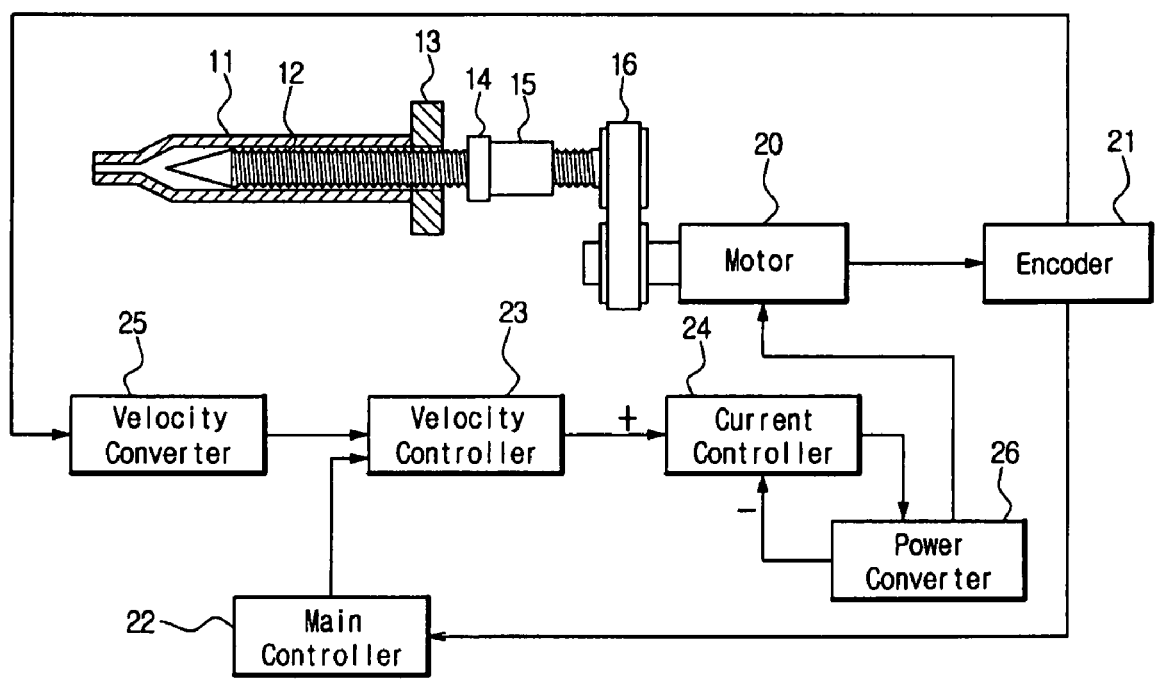
FIG. 1 is a view illustrating the construction of an apparatus for controlling injection in an electric injection molding machine of the prior art.
Figure 2:
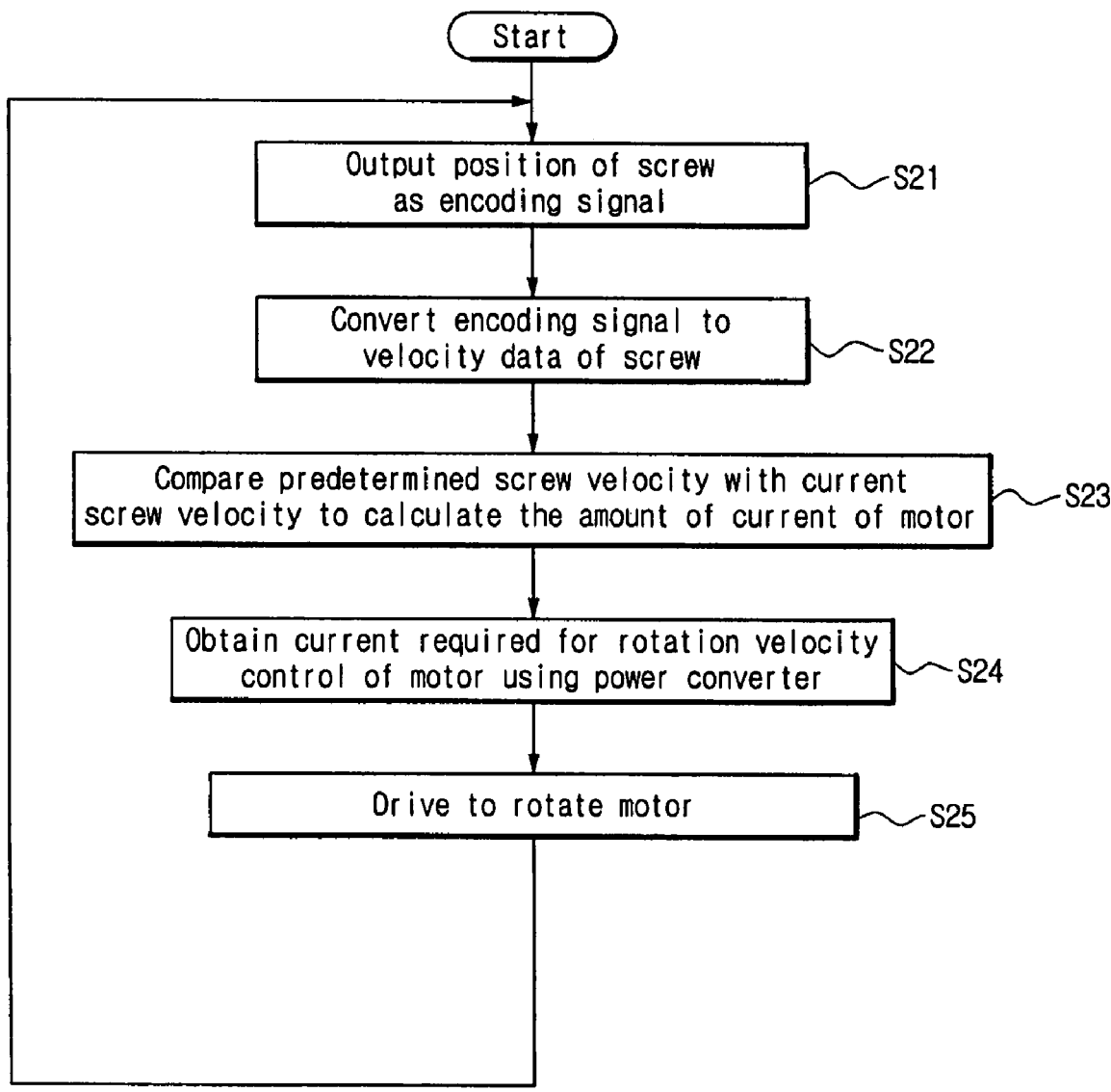
FIG. 2 is a flow chart illustrating a procedure of an injection controlling method in the electric injection molding machine of the prior art.
Figure 3:
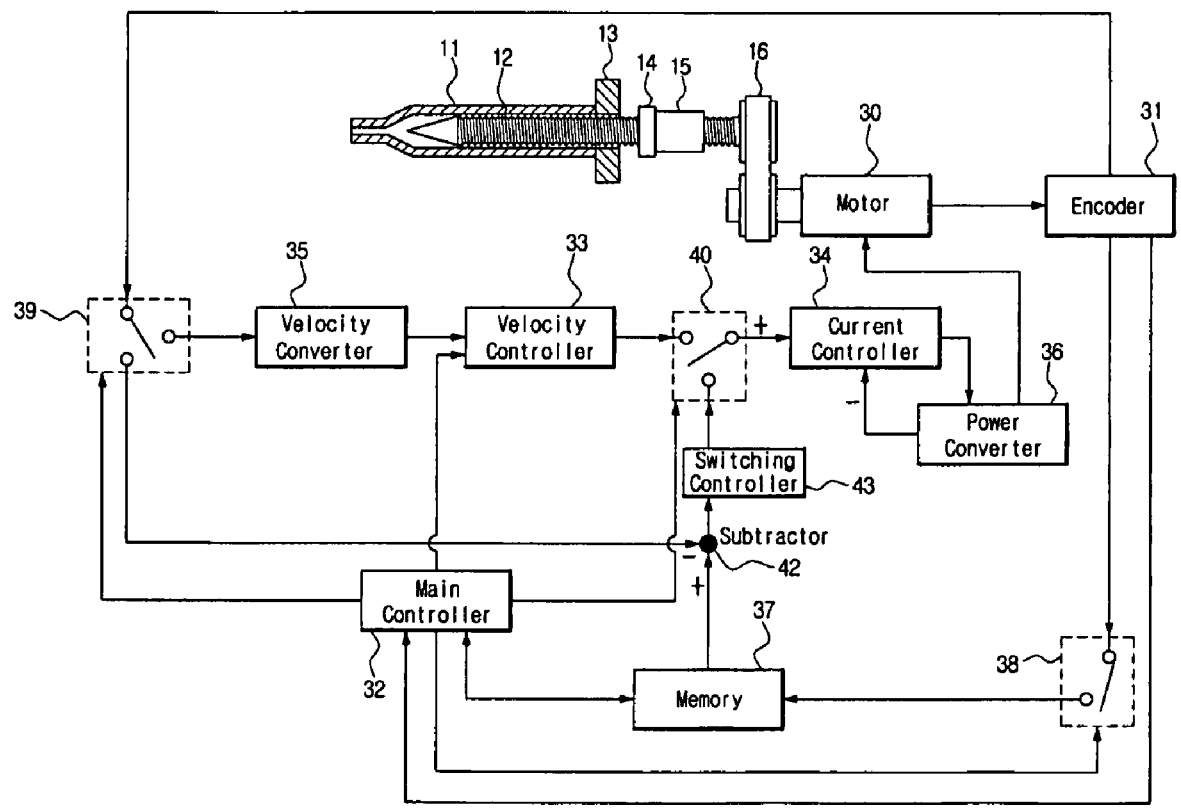
FIG. 3 is a view illustrating the construction of an apparatus for controlling injection in an electric injection molding machine according to an embodiment of the present invention.

An injection controlling apparatus in an electric injection molding machine according to an embodiment of the present invention, as shown in FIG. 3, includes a injection shaft, a motor 30, an encoder 31, a velocity converter 35, a velocity controller 33, a current controller 34, a power converter 36, a main controller 32, a memory 37, first/second/third switching units 38, 39, and 40, a subtractor 42, and a switching controller 43.

The encoder 31 is connected with the motor 30, the main controller 32, the first switching unit 38, and the second switching unit 39, and the first switching unit 38 is connected with the memory 37. The second switching unit 39 is connected with the velocity converter 35 and the subtractor 42, and the memory 37 is connected with the subtractor 42 and the main controller 32.

The velocity converter 35 is connected with the velocity controller 33, which is connected with the main controller 32 and the third switching unit 40.

The third switching unit 40 is connected with the current controller 34, which is connected with the power converter 36.

Further, the power converter 36 is connected with the motor 30.

Herein, since the technical construction of the injection shaft, the motor 30, the velocity converter 35, the velocity controller 33, and the power converter 36 is identical to that of the prior art, the description thereof will be omitted.

The encoder 31 detects a current position of a screw 12 moving back and forth in a barrel 11 according to a drive of the motor 30, outputs the detected position as an encoding signal, and transmits it to the main controller 32, the first and second switching units 38 and 39.

The first switching unit 38 transmits the encoding signal transmitted from the encoder 31 to the memory 37 according to a switching operation.

The second switching unit 39 transmits, to the velocity converter 35 or the subtractor 42, the encoding signal transmitted from the encoder 31 according to the switching operation.

The memory 37 stores the encoding signal transmitted from the first switching unit 38 according to the passage of time from injection start to injection end. That is, the memory 37 stores data of the positions of the screw 12 by a drive of the motor 30 according to the passage of time.

The third switching unit 40 transmits, to the current controller 34, the instruction current value from the switching controller 43 or the velocity controller 33 through the switching operation.

The main controller 32 is connected with the first/second/third switching units 38, 39, and 40, and controls the switching operations of the units according to a request for operation of the switching units via an input unit (not shown).

Further, the main controller 32 checks whether the data of the positions of the screw by time has been completely stored in the memory 37.

Figure 4:
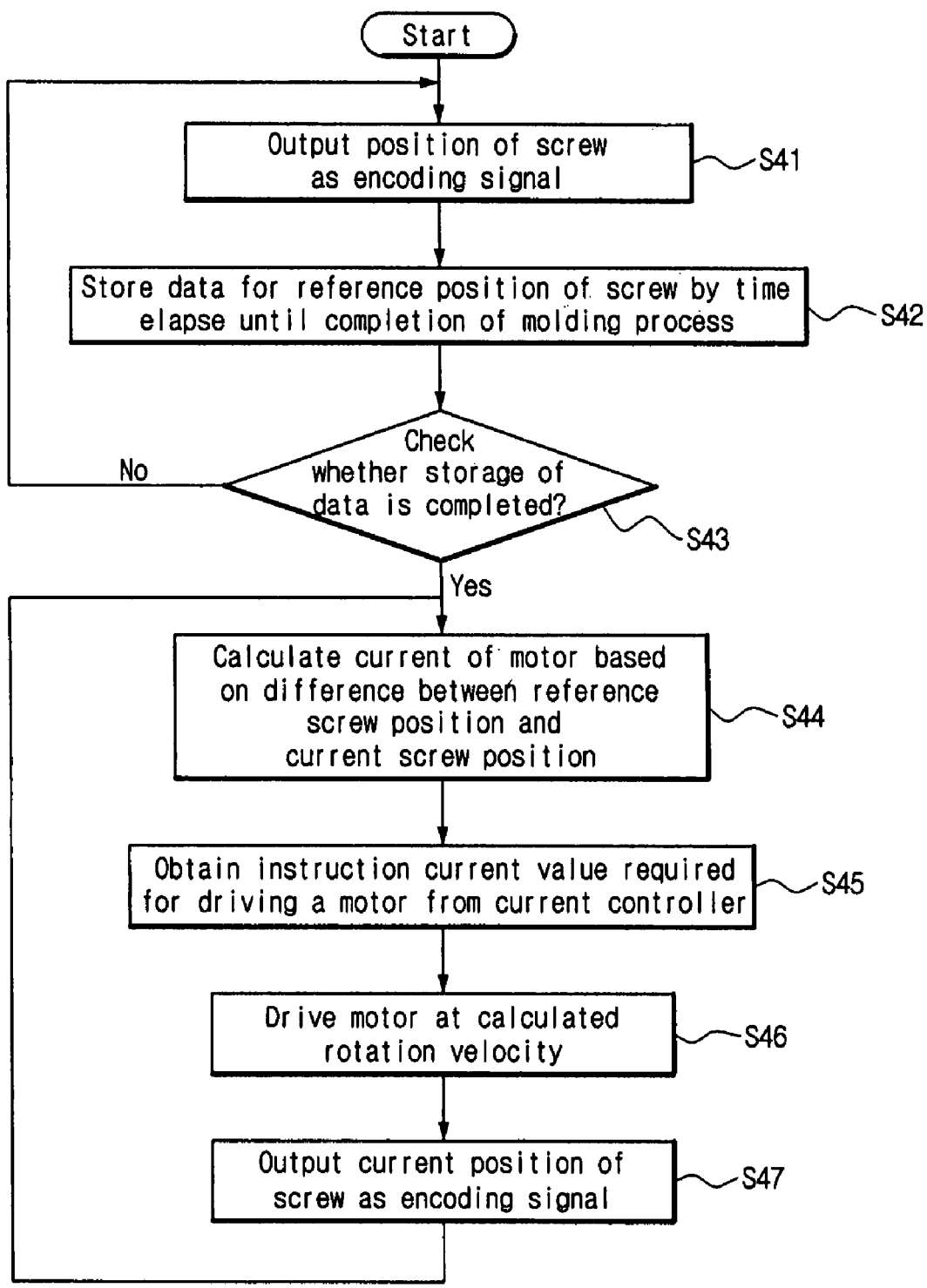
FIG. 4 is a flow chart illustrating a procedure of an injection controlling method in the electric injection molding machine according to the embodiment of the present invention.

Then, in such a construction, an injection controlling method in the injection molding machine according to the embodiment of the present invention will be explained referring to FIG. 4.

First, the main controller 32 controls the second switching unit 39 to connect the velocity converter 35 to the encoder 31, and controls the third switching unit 40 to connect the current controller 34 to the velocity controller 33. When the main controller 32 controls the first switching unit 38 to carry out a connection between the encoder 31 and the memory 37, the encoder 31 outputs, as an encoding signal, the position of the screw 12 moving back and forth in the barrel 11 according to a drive of the motor 30 (S41). Then, the encoder 31 transmits the outputted encoding signal to the main controller 32, the first and second switching units 38 and 39.

The injection shaft is provided with a position sensor, for example, for detecting the position of the screw 12 moving along the drive of the motor 30. The data for the positions of the screw 12, sensed by the position sensor, is transmitted to the encoder 31 via the motor. Then, the encoder 31 outputs, as an encoding signal, the data for the position of the screw through encoding.

Further, for instance, the encoder 31 outputs an encoding signal for the position of the screw through encoding the data for drive of the motor 30.

The first switching unit 38 transmits the encoding signal transmitted from the encoder 31 to the memory 37 according to the switching operation.

The memory 37 stores the encoding signal transmitted from the first switching unit 38 according to the passage of time. That is, the memory 37 stores, by the passage of time, the data for the position of the screw 12 according to the drive of the motor 30. Herein, the memory 37 stores the data for the position of the screw 12 moving back and forth in the barrel from the injection start to the injection end. Such a data for the position of the screw 12, stored in the memory by the passage of time, comes to a data for a reference position of the screw 12 that becomes a reference of control of the moving velocity of the screw 12 to be described later.

In other words, the memory 37 stores, by the passage of time, the data for the reference position of the screw until one injection process is completed (S42). This is possible because the time when the data for the reference position of the screw 12 is stored in the memory 37 can be checked by the main controller 32.

Then, the main controller 32 checks whether the data for the reference position of the screw 12 is completely stored in the memory 37 (S43). For example, the main controller 32 checks whether the operation of the injection molding machine required for completion of molding of a product is completed or not.

Herein, if the data for the reference position of the screw 12 is not yet completely stored in the memory 37, a process is repeated from the step 41.

Meanwhile, if it is completely stored, the main controller 32 controls the first switching unit 38 to disconnect the connection between the encoder 31 and the memory 37. Further, the main controller 32 controls the second switching unit 39 to connect the subtractor 42 to the encoder 31, and controls the third switching unit 40 to connect the switching controller 43 and the current controller 34.

For instance, if the data for the reference position of the screw 12 is completely stored in the memory 37, the main controller 32 controls the switching operations of the first/second/third switching units 38, 39, and 40 according to a user's request.

Then, the current controller 34 receives the current position of the screw 12 as an encoding signal through the third switching unit 40, and checks an elapse of time that the screw 12 moves from the previous position to the current position. Also, the subtractor 42 reads out a section of time corresponding to the checked time elapse from the memory 37, and compares a reference position of the screw 12 corresponding to the read-out section of time with the current position of the screw to thereby a difference therebetween. Then, switching controller 43 calculates an instruction current value based on the difference calculated from the subtractor 43 and the difference variation by time (S44).

Specifically, as a comparison result, if the reference position of the screw 12 does not reach the current position of the screw 12, the switching controller 43 generates the instruction current value such that the current position is provided to decrease. If the reference position of the screw 12 exceeds the current position of the screw 12, the switching controller 43 generates the instruction current value such that the current position is provided to increase. Then, the switching controller 43 transmits the instruction current value to the current controller 34.

Like this, upon injection control in the electric injection molding machine, the data (i.e., the data for the reference position of the screw 12) stored in the memory 37 is used as a reference, so that an injection pressure and a velocity distribution with further improved repetitive precision can be obtained. Thus, deviation of quality between products produced by the electric injection molding machine can be reduced.

Then, the current controller 34 obtains the instruction current value through a feed back control of the current loop, and transmits it to the motor 30 via the power converter 36 (S45).

Thus, the motor 30 is driven while generating a torque value proportional to the amount of the current transmitted from power converter 36 (S46).

Then, the screw 12 moves at a proper velocity according to the drive of the motor 30, and the encoder 31 outputs the current position of the screw 12 as an encoding signal (S47). The encoding signal is transmitted to the main controller 32, and the second and third switching units 39 and 40.

Then, in a state where the velocity loop is removed, the injection control operation as such is repeated from the step 44. That is, the encoding signal indicative of the current position of the screw 12 is directly input to the current controller 34 through the third switching unit 40 together with the data for the reference position of the screw 12 stored in the memory 37 without passing through the velocity controller 33, i.e., the velocity loop.

As set forth before, according to the present invention, the operations of the control loops are minimized upon operation of the injection molding machine to thereby reduce a loop time and a scanning time in the control process and make a production rate of an injection molding product speedy.

Further, optimized positions of the screw by time are used as a reference input of injection control input so that data with improved repetitive precision can be obtained, and that deviation in quality between products manufactured can be reduced.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for controlling injection in an electric injection molding machine including a motor and a screw, the apparatus comprising:
   an encoder detecting a current position of the screw and outputting the detected position as an encoding signal;
   a memory storing reference positions of the screw according to a drive of the motor by the passage of time; and
   a current controller checking an elapse of time that the screw moves from a previous position to a current position through receiving the encoding signal from the encoder, reading out a section of time corresponding to the checked elapse of time from the memory, and controlling a current value applied to the motor based on a difference between a reference position of the screw corresponding to the read-out section of time and a current position of the screw;
   a subtractor calculating a difference between a reference position of the screw and a current position of the screw;
   a switching controller generating an instruction current value based on the difference calculated from the subtractor and the difference variation by time, and transmitting the same to the current controller; and
   a switching section transmitting the encoding signal outputted from the encoder to the current controller and the memory according to a switching operation,
   wherein the switching section includes:
   a first switching unit transmitting the encoding signal outputted from the encoder to the memory according to a switching operation of the first switching unit;
   a second switching unit transmitting the encoding signal outputted from the encoder to the subtractor according to a switching operation of the second switching unit; and
   a third switching unit transmitting the instruction current value of the switching controller to the current controller according to a switching operation of the third switching unit.

2. The apparatus according to claim 1, wherein the memory stores, by the passage of time, reference positions of the screw from injection start to injection end.

3. The apparatus according to claim 1, wherein the switching controller generates the instruction current value in such a way that if the reference position of the screw does not reach the current position of the screw, the instruction current value is generated such that the current position is provided to decrease, and if the reference position of the screw exceeds the current position of the screw, the instruction current value is generated such that the current position is provided to increase.

4. A method of controlling injection in an electric injection molding machine including a motor and a screw, an encoder, a velocity controller, a current controller, a memory, a subtractor, a switching controller, a first switching unit, a second switching unit and a third switching unit, the method comprising the steps of:
   (a) storing data of reference positions of the screw according to a drive of the motor by the passage of time when the first switching unit connects the encoder to the memory, the second switching unit connects the encoder to the velocity controller and the third switching unit connects the velocity controller to the current controller;
   (b) checking an elapse of time that the screw moves from a previous position to a current position to read out a section of time corresponding to the checked elapse of time from the stored data of the memory after disconnecting the memo and the encoder by the first switching unit; and
   (c) calculating an instruction current value based on a difference between a reference position of the screw corresponding to the read-out section of time and a current position of the screw to thereby control a drive of the motor when the second switching unit connects the encoder to the subtractor and the third switching unit connects the switching controller to the current controller,
   wherein the subtractor calculates the differences between the reference position of the screw corresponding to the read-out section of time and the current position of the screw,
   wherein the switching controller calculates the instruction current value, and
   wherein the current controller controls a drive of the motor.

5. The method according to claim 4, wherein the step (a) stores, by the passage of time, reference positions of the screw from injection start to injection end.

6. The method according to claim 4, wherein the step (c) comprises the steps of:
(c1) calculating the instruction current value based on the difference between the reference position of the screw and the current position of the screw; and (c2) obtaining the current corresponding to the calculated quantity of current through a current loop to thereby drive the motor.

* * * * *